UNITED STATES PATENT OFFICE.

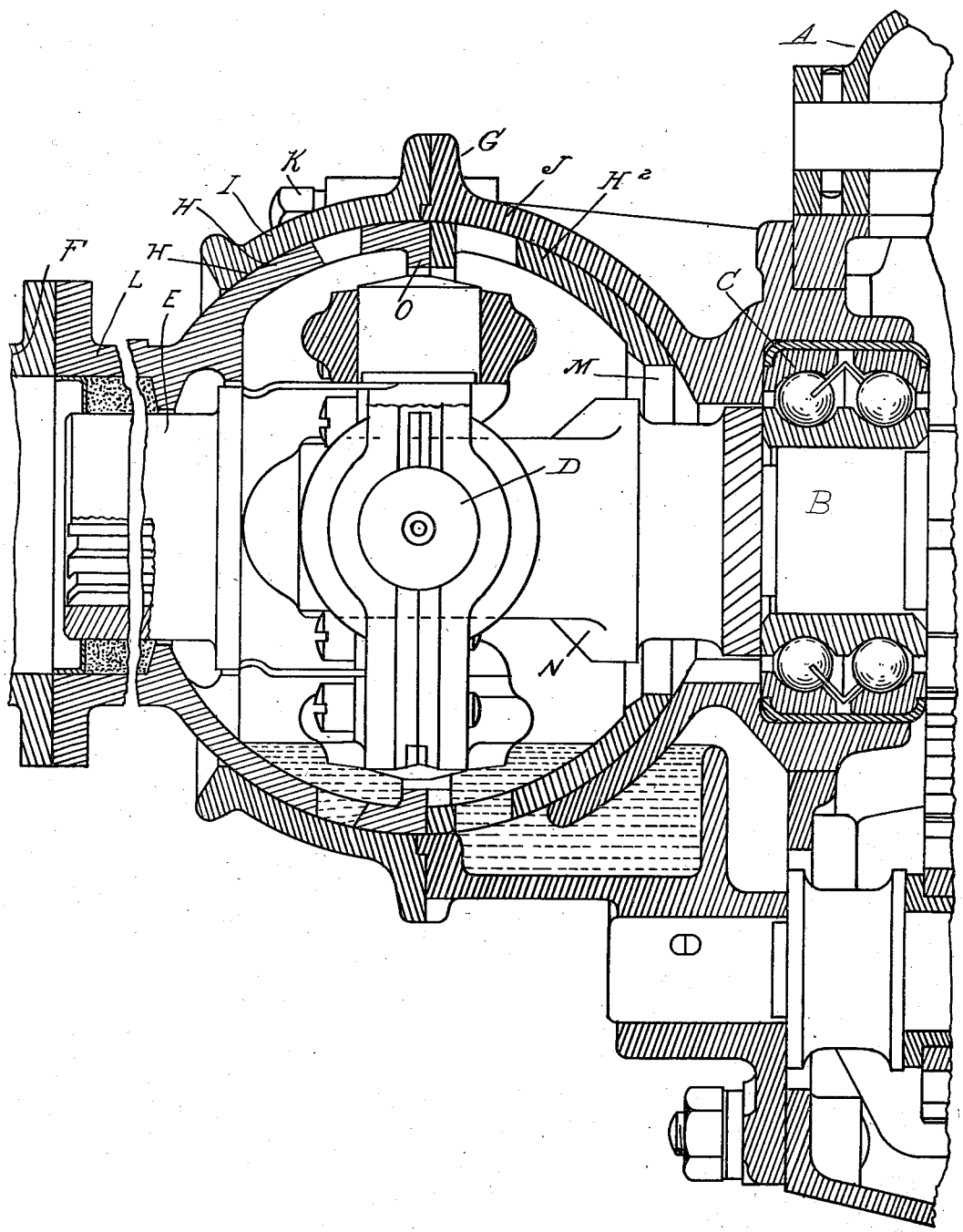

LAFE V. PENCE, OF FLINT, MICHIGAN, ASSIGNOR TO GENERAL MOTORS CORPORATION, OF DETROIT, MICHIGAN, A CORPORATION OF DELAWARE.

PROPELLER DRIVE MECHANISM FOR MOTOR-VEHICLES.

1,277,112. Specification of Letters Patent. Patented Aug. 27, 1918.

Application filed September 1, 1917. Serial No. 189,281.

*To all whom it may concern:*

Be it known that I, LAFE V. PENCE, a citizen of the United States of America, residing at Flint, in the county of Genesee and State of Michigan, have invented certain new and useful Improvements in Propeller Drive Mechanism for Motor-Vehicles, of which the following is a specification, reference being had therein to the accompanying drawings.

The invention relates to motor vehicles of that type in which the driving thrust of the rear axle is transmitted to the vehicle frame through a hollow universal joint forming a housing for a concentrically-arranged universal joint in the rotary driving shaft. It is the object of the invention to obtain a better thrust-bearing for the outer joint and at the same time to permit of readily assembling the inner joint therein. To this end the invention comprises the novel construction as hereinafter set forth.

In the drawings is shown a longitudinal section through the universal joint and a portion of the transmission-gear housing.

A is the housing of the transmission gearing, B is the spline shaft therein, the rear end of which is journaled in a bearing C, D is the universal joint coupling this shaft with the shaft E extending to the axle, F is the tubular housing for the shaft E, and G is the hollow universal joint which couples this housing with the transmission-gear housing A and which is arranged to surround and to be concentric with the universal joint D.

Heretofore it has been customary to form the hollow universal joint G of a single spherical male member H and a two-part spherical female member I J. The members I and J abut each other in the plane of the center of the joint and are secured together by bolts K, thereby permitting of readily assembling with the male member H. On the other hand, the member H is formed of a single section, and as the inner universal joint D is housed therein, it is necessary to provide a sufficient opening for the insertion of the same. This cuts away the segmental thrust-bearing surface of the member H and increases the wear thereof.

To overcome this objection I have devised a construction in which the member H is formed in two sections H' and H² abutting in the plane of the center of the bearings. The section H' is formed with a neck portion L for securing the same to the tubular housing F. The section H² is centrally apertured at M to be sleeved over the shank N of the universal joint D, but this aperture is not of sufficient diameter for the passage of the larger portion of said joint. Consequently the spherical segment which lies between the aperture M and the plane of abutment with the member H' is of sufficient extent to form a substantial thrust-bearing.

In assembling the parts the joint D may be first assembled and placed within the member H', after which the member H² is placed in position and the whole is inserted within the member J, the member I being secured by the bolts K. It is unnecessary to secure the members H' and H² to each other, as they are held from displacement by the outer spherical bearing and the only stress that is transmitted from the member H' to the member H² is an end thrust. I may, however, increase the extent of the abutting surfaces of the members H' and H² by inwardly-extending flanges O, as shown.

What I claim as my invention is:

1. The combination with a rotary transmission-shaft and a universal joint therein, of a tubular housing surrounding said transmission-shaft, and a hollow universal joint surrounding the universal joint in said rotary transmission comprising a female member formed in two sections clamped to each other and a male member also formed in two sections arranged concentrically within said female member and assembled about the inner universal joint from opposite sides thereof.

2. The combination with a rotary transmission-shaft and a universal joint therein, of a housing for said shaft forming a thrust connection to the axle, and a hollow universal joint for connecting said housing to the vehicle frame arranged concentric with the inner joint, said outer joint comprising a two-section male member assembled around said inner joint from opposite ends thereof, the sections abutting in the plane of the center of the joint, and a female member formed in two sections clamped to each other.

3. The combination with a rotary transmission-shaft and a universal joint therein, of a propeller housing surrounding said shaft and having a universal joint surrounding and concentric with the joint of said rotary transmission, said outer joint comprising a pair of segmental spherical members abutting in the central plane and assembled from opposite sides of said inner joint, said pair of members constituting the male member of the joint, and a pair of members constituting the female member of the joint clamped to each other.

4. The combination with a rotary transmission-shaft and a universal joint therein, of a propeller housing surrounding said shaft having a universal joint surrounding and concentric with the joint of the rotary transmission-shaft, said outer joint comprising male and female members, the male member being formed of two spherical segmental sections abutting against each other in the plane of the center, and the female member comprising two segmental spherical sections abutting against and clamped to each other.

5. The combination with a rotary transmission-shaft of a universal joint in said shaft having an enlarged central portion and oppositely-extending shank portions, a hollow propeller shaft surrounding said rotary transmission and a hollow universal joint for connecting said propeller shaft to a fixed portion on the vehicle frame, said hollow joint comprising a male member formed of two centrally-abutting sections surrounding the inner joint and apertured for engaging the shank portions thereof, and a female member formed in two segmental spherical segments embracing said male member and clamped to each other.

In testimony whereof I affix my signature.

LAFE V. PENCE.